United States Patent
Elazary et al.

(10) Patent No.: US 11,046,517 B2
(45) Date of Patent: Jun. 29, 2021

(54) COORDINATED OPERATION OF ROBOTS ON DIFFERENT PLANES

(71) Applicant: inVia Robotics, Inc., Westlake Village, CA (US)

(72) Inventors: Lior Elazary, Agoura Hills, CA (US); Daniel Frank Parks, II, Los Angeles, CA (US); Randolph Charles Voorhies, Sherman Oaks, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 278 days.

(21) Appl. No.: 16/290,514

(22) Filed: Mar. 1, 2019

(65) Prior Publication Data
US 2020/0277138 A1     Sep. 3, 2020

(51) Int. Cl.
*G06F 7/00*    (2006.01)
*B65G 1/137*   (2006.01)
*B25J 9/16*    (2006.01)

(52) U.S. Cl.
CPC .......... *B65G 1/1373* (2013.01); *B25J 9/1679* (2013.01)

(58) Field of Classification Search
USPC ............... 700/213–216, 218, 228–230, 245
See application file for complete search history.

(56) References Cited

U.S. PATENT DOCUMENTS

| 10,214,354 | B2 | 2/2019 | Toebes | |
| 2010/0316468 | A1* | 12/2010 | Lert | B65G 47/57 414/273 |
| 2017/0305668 | A1* | 10/2017 | Bestic | B65G 1/0464 |
| 2019/0168392 | A1* | 6/2019 | Vain | B65G 1/0407 |

* cited by examiner

Primary Examiner — Yolanda R Cumbess
(74) Attorney, Agent, or Firm — Ansari Katiraei LLP; Arman Katiraei; Sadiq Ansari

(57) ABSTRACT

Provided is an automated vertical transfer system for a site that includes one or more mezzanines or other structures that create different operational vertical planes. The system may include a robot controller and one or more robots that operate exclusively on one of the different operational vertical planes. The robot controller may synchronize and/or coordinate the operations of the robots and/or other devices so that objects may be transferred across planes while each robot remains and continues operations on one plane.

16 Claims, 12 Drawing Sheets

COORDINATED OPERATION OF ROBOTS ON DIFFERENT PLANES

TECHNICAL FIELD

The present invention relates to the technical field of robotics.

BACKGROUND INFORMATION

Increasing usage of the vertical space in a site (e.g., a warehouse) is one way with which to increase the storage capacity and/or available resources of the site without increasing the physical footprint of the site. Some sites use mezzanines to create different planes from which to access objects and/or resources.

A mezzanine may be an elevated floor or platform that is installed between the site floor and the site ceiling. Mezzanines may be placed atop the site floor or atop one another in order to create different floors or vertical planes within a site that does not have different floors or vertical planes. A mezzanine may have support pillars and a large flat surface that is supported by the support pillars. Each mezzanine may form a free-standing structure that can be assembled and dismantled in a site or atop another mezzanine. Storage racks with heights that can be accessed by workers may be placed on each mezzanine to store additional objects or resources.

The introduction of mezzanines into a site may break the previous workflows that were used in that site. For instance, when the site was a single floor or plane, all workers would operate from the same vertical plane, and would have the ability to access the same resources from that vertical plane. Mezzanines segregate the site into different vertical planes. Consequently, a worker operating on one mezzanine or vertical plane may be unable to access resources on the ground level or another mezzanine. The inaccessible resources (e.g., resources on a different plane) may be required for the worker to complete one or more assigned tasks. For instance, the worker may retrieve objects for fulfillment of a customer order from a first vertical plane of a site, but may be unable to fulfill the customer order because it cannot deliver the objects to and/or retrieve additional objects from a different second vertical plane of the site due to the vertical separation between the planes and a restriction that prevents the worker from crossing over onto different vertical planes.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide coordinated operation of robots that operate on different planes. The coordinated operation creates an automated vertical transfer system whereby automated devices (e.g., robots, conveyors, lifts, elevators, etc.) synchronize and/or coordinate their operations on different planes while continuing to operate from a single plane. In some embodiments, the synchronized and/or coordinated operation optimizes the execution of tasks so that resources are transferred across different planes without idling the automated devices, and without the time cost and inefficiencies associated with transferring the automated devices across different planes.

Figure 1:
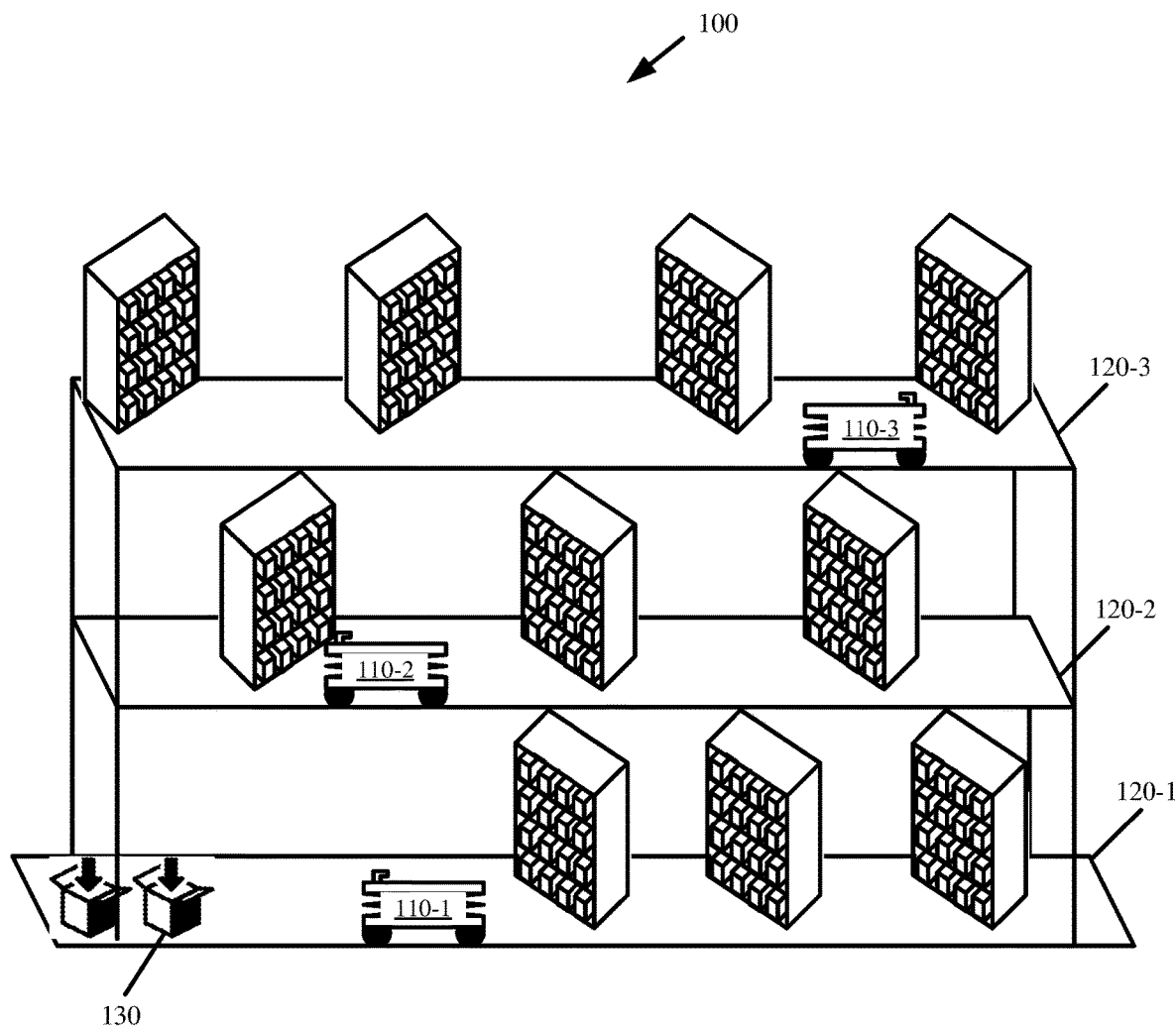
FIG. 1 illustrates an example site with robots that operate on different vertical planes in accordance with some embodiments presented herein.

FIG. 1 illustrates an example of site 100 with robots 110-1, 110-2, and 110-3, operating on different vertical planes 120-1, 120-2, and 120-3, in accordance with some embodiments presented herein. Robots 110-1, 110-2, and 110-3 may be collectively referred to as "robots 110" or individually as "robot 110". Vertical planes 120-1, 120-2, and 120-3 may be collectively referred to as "planes 120" or individually as "plane 120".

As shown in FIG. 1, first robot 110-1 operates on first vertical plane 120-1, second robot 110-2 operates on second vertical plane 120-2, and third robot 110-3 operates on third vertical plane 120-3 of site 100. The operations performed by robots 110 may include order fulfillment tasks (e.g., picking, placing, and/or transferring objects). More generally, the operations performed by robots 110 may include any task that involves accessing resources from vertical planes 120, and consolidating and/or transferring the resources to other vertical planes 120.

Vertical plane 120-1 may correspond to the ground floor, vertical plane 120-2 may correspond to a first mezzanine that elevates a first floor over the ground floor, and vertical plane 120-3 may correspond to a second mezzanine that is placed on the first mezzanine and that elevates a second floor over the first floor. Site 100 may contain additional or fewer mezzanines and/or additional or fewer robots 110 operating on vertical planes 120. The number of mezzanines in site 100 may be restricted by the available height of site 100, and/or the height of each mezzanine.

Robots 110 may be autonomous machines and/or devices that use various sensors and actuators to move about the surface of a plane 120, and/or to access various resources on that plane 120. In some embodiments, the resources may include objects stored to different storage locations on a vertical plane 120. In some embodiments, the objects may include individual items that robots 110 may retrieve. In some embodiments, the objects may be totes, bins, receptacles, and/or other containers that store multiple units of the same or different items. In some such embodiments, robots 110 may retrieve an entire object from a designated storage location, or a specified quantity of an item from the object without transporting the object away from the designated storage location.

Site 100 may correspond to a warehouse or other physical location. Each plane 120 may store different objects that can be used to fulfill different customer orders. The objects may be arranged on racks, tables, stacks, and/or storage apparatus that are distributed across each plane 120. For example, each rack may store different sets of objects at different rows corresponding to different heights over a plane 120 on which the rack is placed.

Fulfillment of a customer order may include using robots 110 to retrieve objects from different storage locations across planes 120, and to aggregate the retrieved objects from different planes 120 at a particular destination (e.g., packing station 130) in a particular plane 120. To do so, the objects of a particular customer order may have to cross planes 120 in order for robots 110 to complete their tasks and/or fulfill that particular customer order.

A simplistic solution may be to provide a path or elevator by which robots 110 can cross over different vertical planes 120. This simplistic solution is inefficient. Allowing robots 110 to traverse the aggregate space from all vertical planes 120 can greatly increase the total time it takes for one robot 110 to perform a task (e.g., time for robot 110 to move from vertical plane 120-1 to vertical plane 120-3 in order to retrieve one object before moving back to vertical plane 120-1 to return the object to packing station 130). Inefficient usage of robots 110 increases costs as each robot 110 is able to complete fewer tasks in a specific amount of time. Moreover, allowing robots 110 to operate on a same plane 120 at any given point in time may create obstacles and/or congestion which could otherwise be avoided by restricting operations of each robot 110 or a different subset of robots 110 to a different vertical plane 120.

Accordingly, some embodiments provide an automated vertical transfer system for synchronizing and/or coordinating the operation of robots 110 on different vertical planes 120 so that objects may cross different vertical planes 120 without robots 110 crossing different vertical planes 120. The automated vertical transfer system may provide a particular robot 110, operating from first vertical plane 120-1, access to resources on a different second vertical plane 120-2 without that particular robot 110 directly accessing those resources on second vertical plane 120-2. More specifically, the automated vertical transfer system may include coordinating the operation of two or more robots 110, that operate on different vertical planes 120 in site 100, to perform a single task that involves accessing one or more of the same resources on different planes 120 without the two or more robots 110 crossing from one vertical plane 120 into another vertical plane 120.

The automated vertical transfer system provides efficient utilization of robots 110 by reducing the total overall distance that each robot 110 traverses in order to complete a task, by reducing congestion as a result of partitioning operation of different sets of robots 110 to different vertical planes 120, by eliminating time associated with one robot 110 crossing between different planes 120 (e.g., from plane 120-1 to plane 120-2), and by increasing and/or optimizing the total number of tasks and/or operations that the collective set of robots 110, operating on different planes 120, complete in a given amount of time. The efficient utilization of robots 110 may also be the result of the automated vertical transfer system synchronizing and coordinating the operation of robots 110 so that resources are transferred across different planes 120 without idling robots 110.

Figure 2:
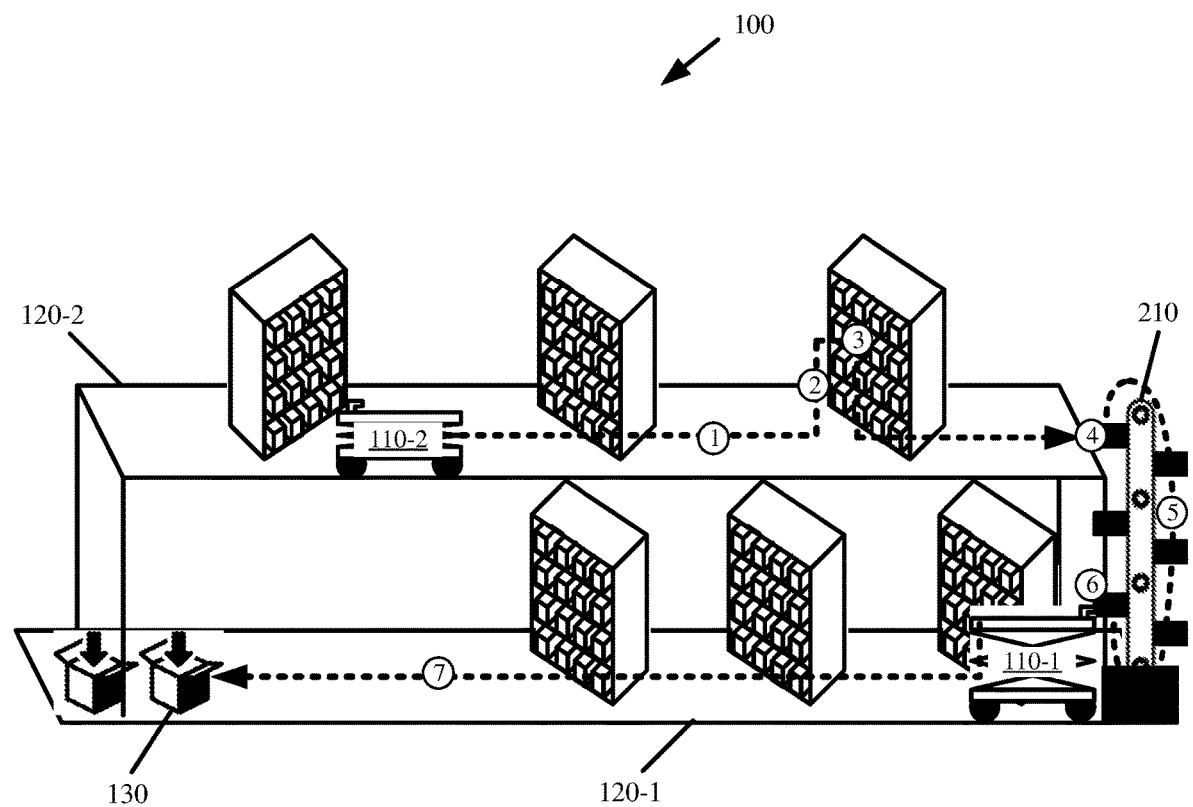
FIG. 2 illustrates an example of an automated vertical transfer system providing coordinated operation between robots operating on different vertical planes in accordance with some embodiments presented herein.

FIG. 2 illustrates an example of the automated vertical transfer system providing coordinated operation between robots 110 operating on different vertical planes in accordance with some embodiments presented herein. FIG. 2 illustrates site 100 with first robot 110-1 operating on first vertical plane 120-1, second robot 110-2 operating on second vertical plane 120-2, and automated conveyor 210 spanning the vertical distance between first vertical plane 120-1 and second vertical plane 120-2. As in FIG. 1, second vertical plane 120-2 may be created by a mezzanine that is placed onto or over first vertical plane 120-1.

As shown in FIG. 2, first robot 110-1 and second robot 110-2 use automated conveyor 210 to facilitate the transfer of an object between planes 120-1 and 120-2 in a synchronized and coordinated manner that allows first robot 110-1 to initiate the transfer of the object between planes 120-1 and 120-2 and to perform different operations during the transfer, and with second robot 110-2 performing one or more other tasks until the transfer is complete. The synchronized and coordinated operation allows first robot 110-1 to continuously and/or exclusively operate on first plane 120-1 while second robot 110-2 continuously and/or exclusively operates on second plane 120-2.

Automated conveyor 210 may be a mechanical lifting and lowering device. In some embodiments, automated conveyor 210 may include a plurality of slots and a motor that rotates each slot between vertical planes 120. More specifically, automated conveyor 210 may have at least a first point of access at a first position on first vertical plane 120-1, and a second point of access at a second position on second vertical plane 120-1 that is vertically aligned with the first position. From these points of access, robots 110 may place objects onto or retrieve objects from conveyor 210.

Conveyor 210 may rotate in a loop such that a first side, first set of slots, or first set of ledges move objects upwards, and a second side, second set of slots, or second set of ledges move objects downwards. Automated conveyor 210 may also reverse directions such that the first side, first set of slots, or first set of ledges move objects downwards while the second side, second set of slots, or second set of ledges move objects upwards.

In some embodiments, automated conveyor 210 may continuously operate (e.g., continuously rotate without stopping). In some other embodiments, operation of automated conveyor 210 may be triggered in response to certain messages that are provided by robots 110 or a robot controller, or in response to certain events that are detected by sensors of automated conveyor 210 (e.g., placement of an object on automated conveyor 210 by a robot 110).

In FIG. 2, second robot 110-2 may move (at 1) to the storage location of a particular object on second vertical plane 120-2. Second robot 110-2 may raise (at 2) its lift to align the vertical height of a retriever that is atop the lift with a height of the particular object in a storage rack at the storage location, and may retrieve (at 3) the particular object from the storage rack at the storage location on second vertical plane 120-2 using the retriever. Second robot 110-2 may then move and place (at 4) the particular object onto conveyor 210. After placing (at 4) the particular object onto conveyor 210, second robot 110-2 may execute other tasks on second vertical plane 120-2.

Conveyor 210 may activate (at 5) in order to move the particular object down from second vertical plane 120-2 to first vertical plane 120-1. The operation of first robot 110-1 may be synchronized and/or coordinated with activation (at 5) of conveyor 210 and/or placement (at 4) of the particular object on conveyor 210 by second robot 110-2 such that first robot 110-1 may retrieve (at 6) the particular object from conveyor 210 when the particular object is transferred to first vertical plane 120-1. First robot 110-1 may then move (at 7) the particular object to a desired destination (e.g., packing station 130) about first vertical plane 120-1.

Synchronized and coordinated operations of robots 110 and/or conveyor 120 may further include ensuring that first robot 110-1 does not retrieve (at 6) an object from conveyor 210 other than the particular object placed (at 4) by second robot 110-2 onto conveyor 210, that another robot on first vertical plane 120-1 (e.g., a robot other than first robot 110-1) does not retrieve the particular object placed (at 4) on conveyor 210 by second robot 110-2, and timing the operations of first robot 110-1 and second robot 110-2 so that the particular object does not remain or fall off conveyor 210. As a result of the synchronized and coordinated operations of robots 110, neither first robot 110-1 nor second robot 110-2 is idle for an extended period of time during the object transfer, and one robot 110 can execute a different task while another robot 110 is engaged in the performance of the object transfer task.

Figure 3:
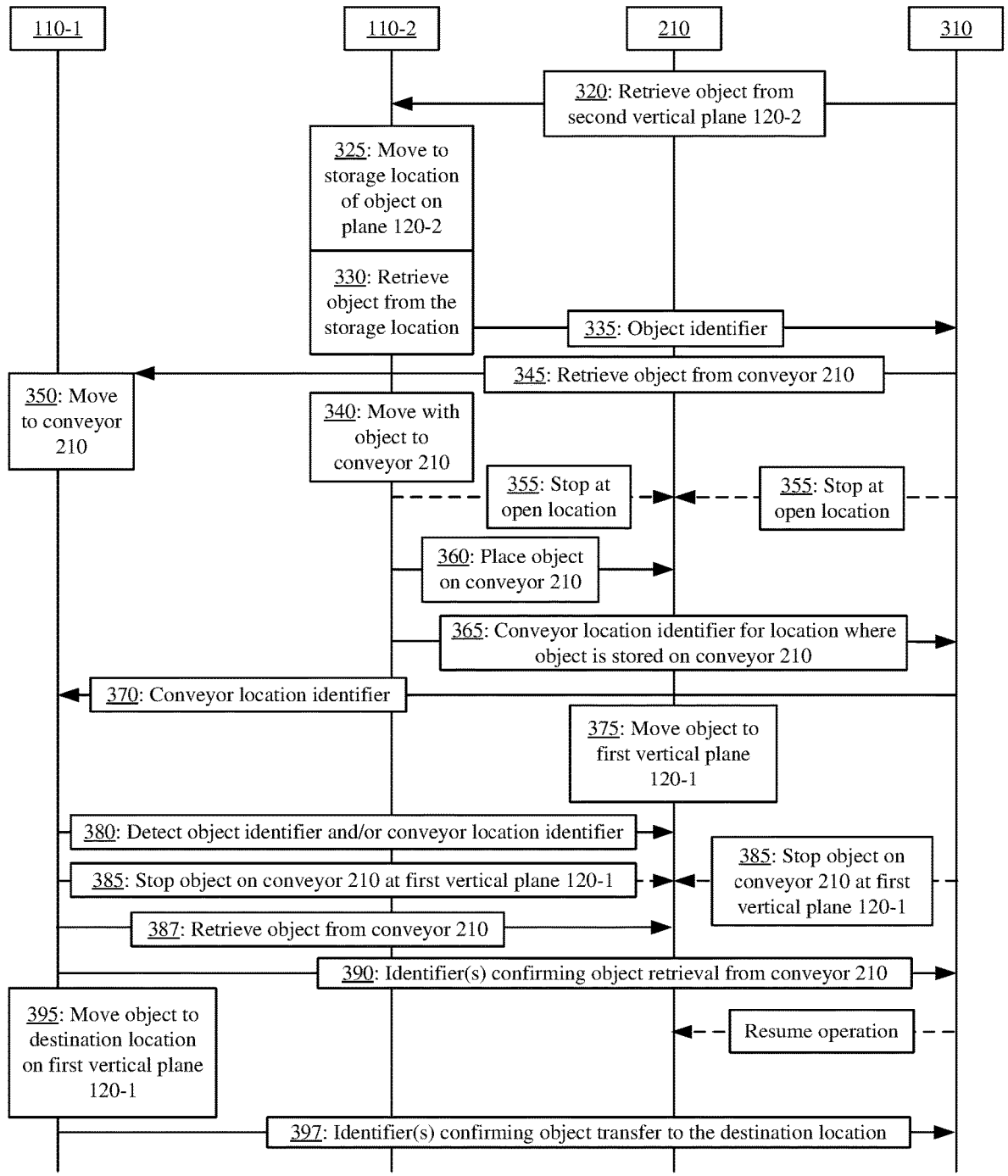
FIG. 3 provides example operations and messaging for the methodology coordinating operations between a first robot and a second robot when transferring objects between different vertical planes using a conveyor in accordance with some embodiments.

In some embodiments, the coordinated operation between first robot 110-1 and second robot 110-2 for transferring objects between vertical planes 120-1 and 120-2 via conveyor 210 may occur according to the methodology illustrated in FIG. 3. FIG. 3 provides example operations and messaging for the methodology coordinating operations between first robot 110-1 and second robot 110-2 when transferring objects between different vertical planes 120-1 and 120-2 using conveyor 210 in accordance with some embodiments.

FIG. 3 introduces robot controller 310 as part of the automated vertical transfer system. In some embodiments, robot controller 310 may be a centralized device that is located within or away from site 100. For instance, robot controller 310 may be implemented on and/or execute from computers or servers that are physically separate from first robot 110-1, second robot 110-2, and conveyor 210. In some other embodiments, robot controller 310 may be a distributed device that runs on one or more of first robot 110-1, second robot 110-2, conveyor 210, and/or other devices of the automated vertical transfer system (e.g., other robots 110). Robot controller 310 may coordinate the operations of first robot 110-1, second robot 110-2, conveyor 210, and/or other physical resources of the automated vertical transfer system.

In some embodiments, robot controller 310 directly controls operations of first robot 110-1, second robot 110-2, and conveyor 210 by accessing sensors thereof and activating one or more actuators for task execution. In some other embodiments, robot controller 310 facilitates the exchange of messaging between first robot 110-1, second robot 110-2, conveyor 210, and/or other systems and devices in site 100 such that each device may independently use its own sensors and actuators to complete subtasks of an overall task with the exchange of messaging coordinating the execution of the subtasks. For instance, rather than have robot controller 310 control motors of first robot 110-1 to move first robot 110-1 to a desired location, robot controller 310 may provide a message that causes first robot 110-1 to move to the desired location.

The coordinated operation may commence in response to second robot 110-2 directly, or indirectly via robot controller 310, receiving (at 320) an instruction to transfer an object that is stored on second vertical plane 120-2 to a destination that is on first vertical plane 120-1. The instruction may provide a first identifier for identifying the object and/or the storage location for the object on second vertical plane 120-2, and/or a second identifier for identifying the destination for receiving the transferred object. The identifiers may be fiducials, barcodes, Quick Response ("QR") codes, one or more visual features, and/or other visual markers for identifying the object, the location for retrieving the object, and/or the destination location.

In response to receiving (at 320) the instruction, second robot 110-2 may move (at 325) about second vertical plane 120-2 to the object's storage location, and may retrieve (at 330) the object from the storage location. In some embodiments, second robot 110-2 may store a mapping of the storage locations on second vertical plane 120-2 to determine how to move to the storage location. In some embodiments, second robot 110-2 may use various identifiers and/or sensors on second vertical plane 120-2 to locate the object's storage location. In some embodiments, the instruction provided by robot controller 310 may include navigational operations that second robot 110-2 is to perform in order to reach the object's storage location.

During or after the object retrieval, second robot 110-2 may image and/or scan the identifier that identifies the retrieved object. Second robot 110-2 may (at 335) provide the identifier to robot controller 310. In response to receiving the identifier, robot controller 310 may confirm retrieval of the correct object by second robot 110-2. The identifier may be located on the object (e.g., a barcode, fiducial, visual features, etc.), or at the object storage location (e.g., on a rack or other storage apparatus containing the object).

In response to confirming retrieval of the correct object by second robot 110-2, robot controller 310 may coordinate synchronized and/or parallel operation of conveyor 210, first robot 110-1, and/or other devices of the automated vertical transfer system while second robot moves (at 340) to transfer the retrieved object onto conveyor 210. For instance, robot controller 310 may wirelessly disseminate (at 345) the object identifier to first robot 110-1 and/or an instruction for first robot 110-1 to retrieve the object, identified via the object identifier, from conveyor 210. The instruction may cause first robot 110-1 to time its movement (at 350) towards conveyor 210 so that the object retrieved by second robot 110-2 may be transferred to first robot 110-1 via conveyor 210 in a synchronized and coordinated manner. In some embodiments, second robot 110-2 or robot controller 310 may first identify availability of first robot 110-1 on first vertical plane 120-1 before issuing (at 345) the instruction for first robot 110-1 to retrieve the object from conveyor 210.

Second robot 110-2 may place (at 360) the retrieved object at a particular location on conveyor 210 upon arriving at conveyor 210. For instance, second robot 110-2 may align its positioning before conveyor 210, and may push the retrieved object onto the particular location of conveyor 210. In some embodiments, second robot 110-2 may submit (at 355) a command, directly or indirectly via robot controller 310, for conveyor 210 to stop movement when an open slot on conveyor 210 is positioned at second vertical plane 120-2. In some such embodiments, conveyor 210 may include one or more sensors to identify open slots. Alternatively, robot controller 310 or conveyor 210 may track open and occupied slots based on messaging provided by robots 110 placing objects onto conveyor 210, and removing objects from conveyor 210.

Second robot 110-2 may image or scan an identifier corresponding to the particular location on conveyor 210 where second robot 110-2 places the retrieved object, and may provide (at 365) the identifier for the particular location on conveyor 210 to robot controller 310. In some embodiments, conveyor 210 may provide (at 365), to robot controller 310, the identifier for an open location that is available to receive the object from second robot 110-2 when conveyor 210 uses its sensors to detect the open location and to stop movement when the open location reaches second vertical plane 120-2. In some embodiments, robot controller 310 may track open slots and occupied slots of conveyor 210, may control operation of conveyor 210, and may therefore determine the identifier for the open slot that receives the object from second robot 110-2.

Robot controller 310 may optionally transmit (at 370) the conveyor location identifier storing the retrieved object to first robot 110-1 to provide first robot 110-1 with two identifiers (e.g., the object identifier and the conveyor location identifier) by which to identify and retrieve the desired object from conveyor 210.

Conveyor 210 may move (at 375) the particular conveyor location, now containing the object retrieved by second robot 110-2, to a position about first vertical plane 120-1 where the object can be accessed by first robot 110-1. When first robot 110-1 arrives before conveyor 210 at first vertical plane 120-1, first robot 110-1 may begin imaging or scanning identifiers on conveyor 210 until first robot 110-1 detects (at 380) the object identifier and/or the conveyor location identifier.

In response to first robot 110-1 detecting (at 380) the object identifier and/or the conveyor location identifier, first robot 110-1 may retrieve (at 387) the object that was previously placed on conveyor 210 by second robot 110-2. In some embodiments, first robot 110-1 may retrieve (at 387) the object from the particular location on conveyor 210 as conveyor 210 continues moving. In some other embodiments, robot controller 310 may control conveyor 210 in order to stop (at 385) movement of conveyor 210 when the particular location, containing the object retrieved by second robot 110-2, reaches first vertical plane 120-1. In still some other embodiments, conveyor 210, upon receiving the object from second robot 110-2 at the particular location of conveyor 210, may be programmed or may use one or more sensors to move and to stop (at 385) the particular location when the particular location reaches first vertical plane 120-1. In still some other embodiments, first robot 110-1 may detect (at 380) the identifier for the particular location, and may provide an instruction to conveyor 210 that causes conveyor 210 to temporarily stop (at 385) movement so that first robot 110-1 may retrieve the object from the particular location.

First robot 110-1 may scan the object identifier and/or the conveyor location identifier, and may provide (at 390) the one or more identifiers to robot controller 310 to verify that first robot 110-1 has retrieved the correct object from conveyor 210 and/or to coordinate operations of other devices of the automated vertical transfer system (e.g., instruct conveyor 210 to resume movement).

First robot 110-1 may then transfer (at 395) the object to the destination location on first vertical plane 120-1. To confirm proper transfer and/or placement of the object at the destination location, first robot 110-1 may image or scan an identifier of the object and/or the destination location, and provide (at 397) the identifier(s) to robot controller 310.

FIGS. 2 and 3 illustrate first robot 110-1, second robot 110-2, and conveyor 210 coordinating their operations to complete a singular task that involves transferring an object across different vertical planes on which first robot 110-1 and second robot 110-2 operate. The singular task may be one of several order fulfillment tasks that first robot 110-1, second robot 110-2, and conveyor 210 perform in a synchronized and/or coordinated manner. The singular task may alternatively be an object management, inventory management, and/or other task that involves resources on different planes 120.

Figure 4:
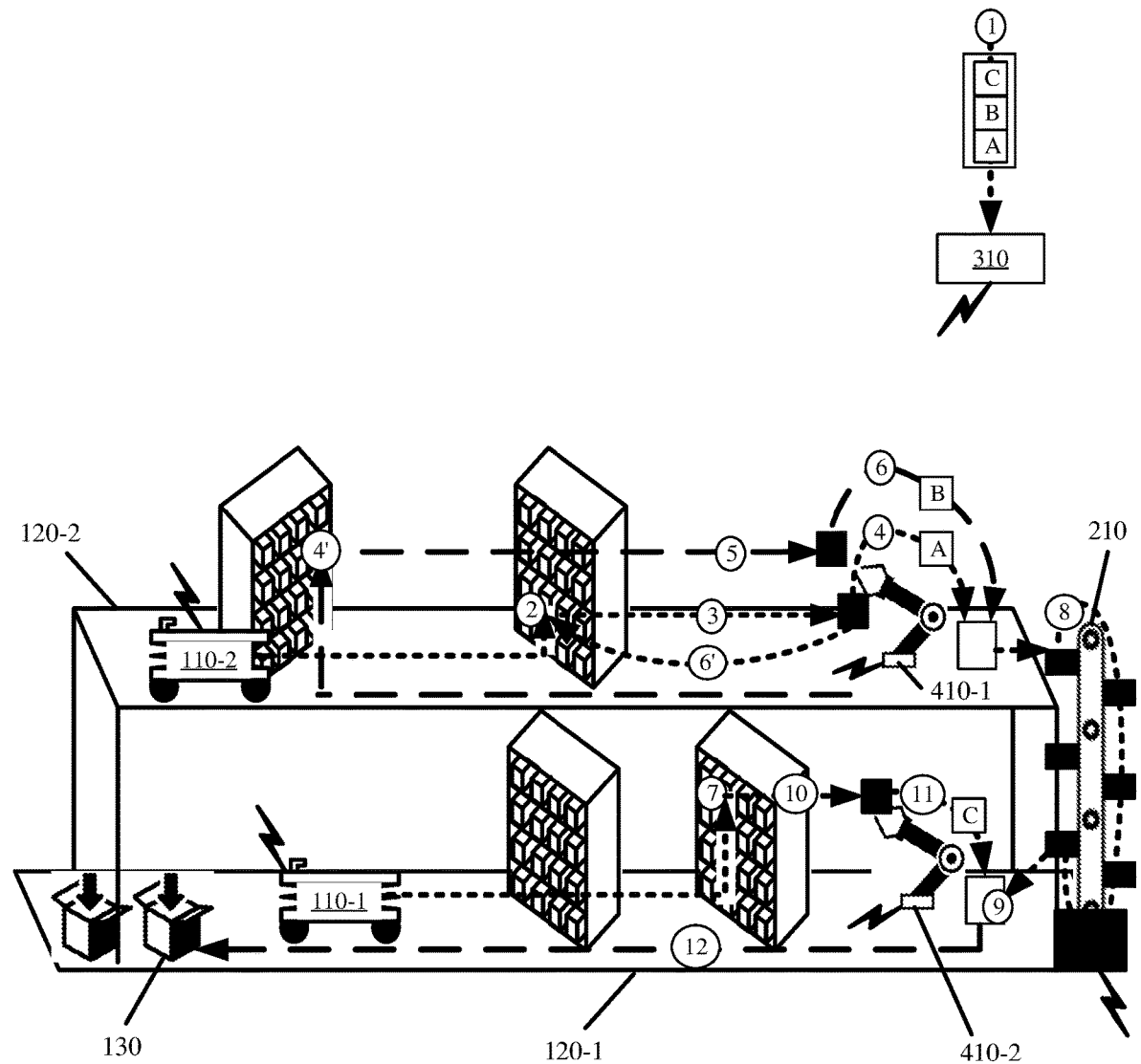
FIG. 4 illustrates synchronizing and coordinating tasks that involve consolidation of objects within each plane and different vertical planes in accordance with some embodiments.

FIG. 4 illustrates synchronizing and coordinating tasks that involve consolidation of objects within each plane and different vertical planes 120 in accordance with some embodiments. FIG. 4 includes robot controller 310 synchronizing and coordinating tasks of object retrieval robots 110, object picking robots 410-1 and 410-2, and conveyor 210. Object picking robots 410-1 and 410-2 may include articulating mechanical arms that are controlled by robot controller 310 and/or that wirelessly receive messaging from robot controller 310.

The synchronized and coordinated tasks of FIG. 4 may commence in response to robot controller 310 receiving (at 1) a particular customer order requesting first, second, and third items. Robot controller 310 may query an object-to-storage location mapping to determine that the first and second items are located at storage locations on second vertical plane 120-2, and to determine that the third item is located at a storage location on first vertical plane 120-1.

Accordingly, robot controller 310 may send messaging to second robot 110-2 that controls second robot 110-2 in retrieving (at 2) a first object, containing multiple units of the first item, from the first storage location on second vertical plane 120-2, and in delivering (at 3) the first object to object picking robot 420-2 positioned near conveyor 210. Robot controller 310 may detect when second robot 110-2 retrieves the first object based on second robot 110-2 providing robot controller 310 with a scanned identifier of the first object, and may detect the delivery of the first object to object picking robot 420-2 by tracking movements of second robot 110-2, by receiving a scanned identifier identifying object picking robot 420-2 from second robot 110-2, or by input provided from a sensor of object picking robot 420-2.

In response to detecting delivery of the first object to object picking robot 420-2, robot controller 310 may send messaging that controls object picking robot 420-2 in transferring (at 4) one or more units of the first item from the first object into a particular container that is used to aggregate items of the particular customer order. Contemporaneously, robot controller 310 may direct second robot 110-2 in retrieving (at 4') a second object, containing multiple units of the second item, from the second storage location on second vertical plane 120-2.

Robot controller 310 may detect second robot 110-2 delivering (at 5) the second object to object picking robot 420-2 by tracking movements of second robot 110-2, by receiving scanned identifiers of the second object and object picking robot 420-2 from second robot 110-2, or by input from a sensor of object picking robot 420-2. In response to detecting delivery of the second object to object picking robot 420-2, robot controller 310 may send messaging to object picking robot 420-2 that controls object picking robot 420-2 in transferring (at 6) one or more units of the second item from the second object into the particular container, and may send messaging to second robot 110-2 that controls second robot 110-2 in returning (at 6') the first object back to a storage location on second vertical plane 120-2.

Robot controller 310 may determine that the particular customer order has no additional items located on second vertical plane 120-2, and has one remaining object that is located on first vertical plane 120-1. Accordingly, robot controller 310 may control first robot 110-1 in retrieving (at 7) a third object, containing the remaining third item of the particular customer order, from a storage location on first vertical plane 120-1. Robot controller 310 may further control object picking robot 420-2 in transferring the container, storing the first and second items, to conveyor 210, and may activate conveyor 210 to transfer (at 8) the container from second vertical plane 120-2 to first vertical plane 120-1.

Robot controller 310 via one or more sensors of conveyor 210 or object picking robot 420-1, that is located on first vertical plane 120-1, may detect when conveyor 210 moves the container to first vertical plane 120-1. In response to detecting the transfer of the container to first vertical plane 120-1, robot controller 310 may direct object picking robot 420-1 in removing (at 9) the container off conveyor 210. Upon first robot 110-1 delivering (at 10) the third object to object picking robot 420-1, object picking robot 420-1 may transfer (at 11) one or more units of the third item from the third object, that are part of the particular customer order, to the container.

Robot controller 310 may detect when the item transfer from the third object is complete, and may further detect that the particular customer order is complete. In response, robot controller 310 may control first robot 110-1 in transferring (at 12) the container with the completed particular customer order to destination 130. Accordingly, FIG. 4 provides an example of robot controller 310 synchronizing and coordinating the operation of multiple robots and/or devices so the particular customer order can be fulfilled by first consolidating items of the order that are on second vertical plane 120-2 before transferring the consolidated set of items to the first vertical plane 120-1 in a manner that minimizes delay resulting from one robot or device waiting on another robot or device in order to complete a given sub-task.

Conveyor 210 may be one of several different vertical transport devices. The automated vertical transfer system may support other vertical transport devices. For instance, conveyor 210 may be a spiral conveyor system. The spiral conveyor system may include a rotating corkscrew with ledges or sides that can move objects up or down past different vertical planes 120. Conveyor 210 may be a bucket or bin conveyor system that has several buckets or bins that can retain one or more objects, and that rotate about the vertical ends (e.g., top and bottom) of conveyor 210. Other types of conveyors 210 may similarly be used for performing the coordinated transfer of objects with robots 110 and between different vertical planes 120.

Conveyor 210 may include one or more sensors. In some embodiments, the one or more sensors may be located on each storage ledge, slot, or side of conveyor 210. In some embodiments, the one or more sensors may also be located at each vertical plane 120 that conveyor 210 accesses. For instance, a conveyor 210 that access first vertical plane 120-1, second vertical plane 120-2, and third vertical plane 120-3 may have at least one sensor at each vertical plane 120. The one or more sensors may detect the placement and/or removal of objects from conveyor 210. For instance, weight or force sensors may detect when an object is placed or removed from a position on conveyor 210. Other sensors may be used to determine what object is placed on or removed from conveyor 210. For instance, the sensors may include cameras or scanners that image or scan the objects being placed on or removed from conveyor 210.

Conveyor 210 may also include wired or wireless network connectivity for communicating the sensor data to robots 110 and/or robot controller 310. Robot controller 310 may synchronize and coordinate the operations of robots 110 with the operations of conveyor 210 based on the sensor data. For instance, the synchronized operation between a robot 110 and conveyor 210 may include stopping conveyor 210 with an open location aligned with a position of robot 110 so that robot 110 may transfer an object to the open location.

In some embodiments, conveyor 210 may be replaced or substituted with a lift or elevator. The lift of elevator may include storage slots or locations for transferring multiple objects between different vertical planes 120. For instance, the lift or elevator may include a storage apparatus with different sized slots into which different sized objects may be placed for transfer to another vertical plane 120 or floor within site 100. The lift or elevator may alternatively include an open space or flat platform onto which robots 110 may place objects and/or moveable storage apparatus for transfer to another vertical plane 120 or floor within site 100. In either case, robots 110 do not go onto the lift or elevator when the lift or elevator is moving. Rather, first robot 110-1, operating on first vertical plane 120-1, may place a first object on the lift or elevator, and then set about retrieving another object, that is stored on first vertical plane 120-1, while the lift or elevator moves the first object to second vertical plane 120-2. The operations of robots 110 and lift or elevator may be coordinated by robot controller 310 to time the arrival of second robot 110-2, operating on second vertical plane 120-2, before the lift or elevator upon the lift or elevator reaching second vertical plane 120-2. Second robot 110-2 may then retrieve the object placed onto the lift or elevator by first robot 110-1, and/or may place another object onto the lift or elevator for transfer to first vertical plane 120-1 or another vertical plane 120 (e.g., different than second vertical plane 120-2).

Figure 5A:
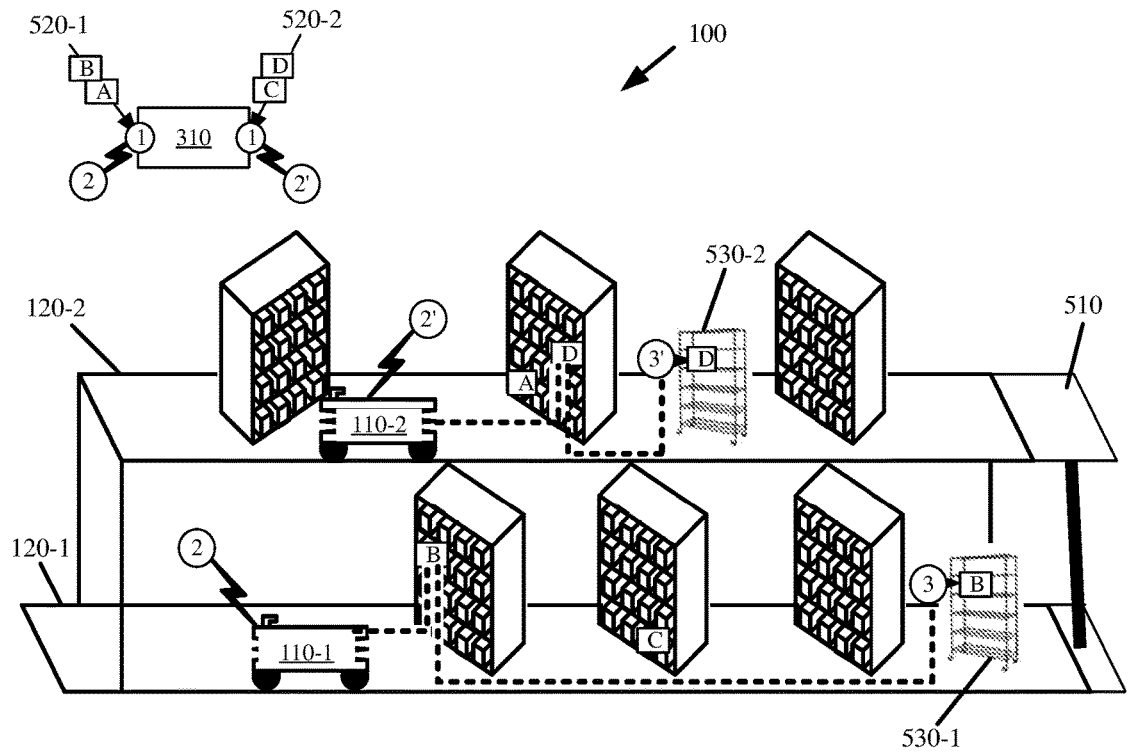
FIGS. 5A, 5B, 5C, and 5D illustrate an example of coordinating the operation of robots on different vertical planes for the transfer of objects between different vertical planes using a lift in accordance with some embodiments.

FIGS. 5A, 5B, 5C, and 5D illustrate an example of coordinating the operation of robots 110 on different vertical planes 120 for the transfer of objects between different vertical planes 120 using lift 510 in accordance with some embodiments. As shown in FIG. 5A, the coordinated operation commences in response to robot controller 310 receiving (at 1 and 1') a set of customer orders 520-1 and 520-2 (hereinafter sometimes collectively referred to as "customer orders 520" or individually as "customer order 520"). Each order of the set of customer orders 520 may include objects that are located about first vertical plane 120-1 and/or second vertical plane 120-2.

Robot controller 310 initiates a first coordinated operation. For instance, robot controller 310 may operate (at 2) first robot 110-1, located on first vertical plane 120-1, to retrieve one or more objects for first customer order 520-1 that are located on first vertical plane 120-1, while simultaneously operating (at 2') second robot 110-2, located on second vertical plane 120-2, to retrieve one or more objects for second customer order 520-2 that are located on second vertical plane 120-2.

In some embodiments, robots 110 may retrieve the one or more objects, and store the objects in a bin or platform carried by each robot 110. In some other embodiments, and as shown in FIG. 5A, first robot 110-1 may place (at 3) the one or more retrieved objects of first customer order 520-1 on first storage cart 530-1, and second robot 110-2 may place (at 3') the one or more retrieved objects of second customer order 520-2 on second storage cart 530-2. In particular, first robot 110-1 may scan an identifier of each object from first customer order 520-1 that is placed onto first storage cart 530-1, and second robot 110-2 may scan an identifier of each object from second customer order 520-2 that is placed onto second storage cart 530-2.

The scanned identifiers may be tracked by each robot 110, or may be sent to robot controller 310, to determine when the retrieval for objects of first customer order 520-1 stored on first vertical plane 120-1 is complete, and when the retrieval for objects of second customer order 520-2 stored on second vertical plane 120-2 is complete. Robot controller 310 may track the completion of tasks at each vertical plane 120 in order to initiate and/or coordinate the next set of operations for robots 110 and lift 510.

Figure 5B:
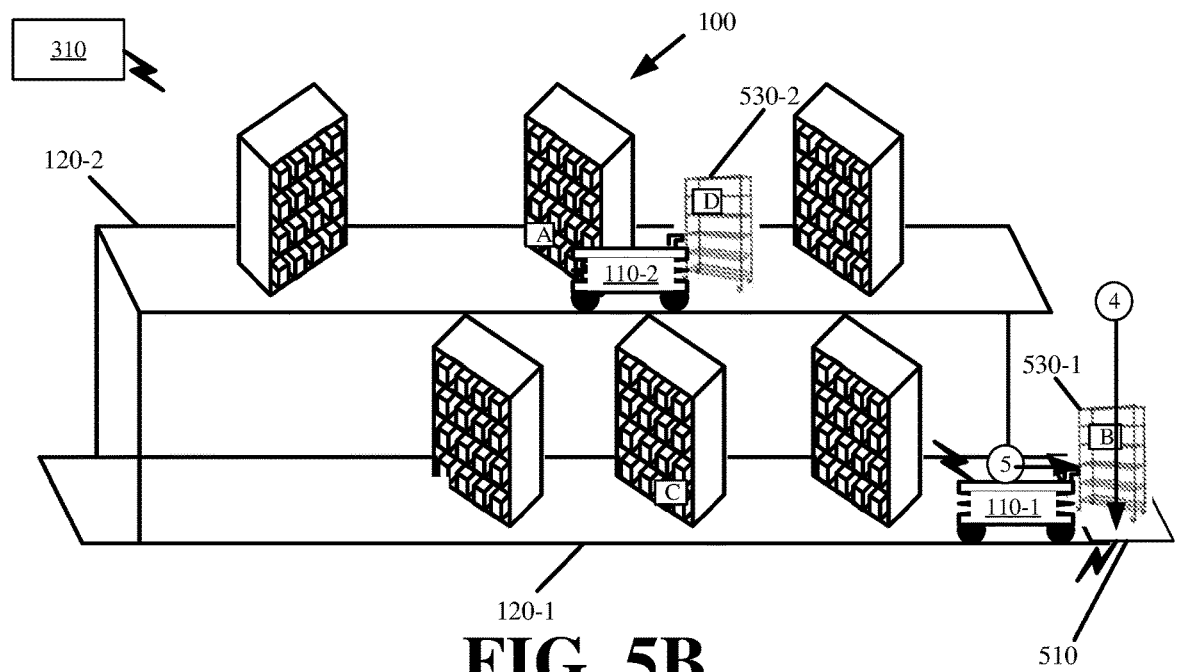
Figure 5C:
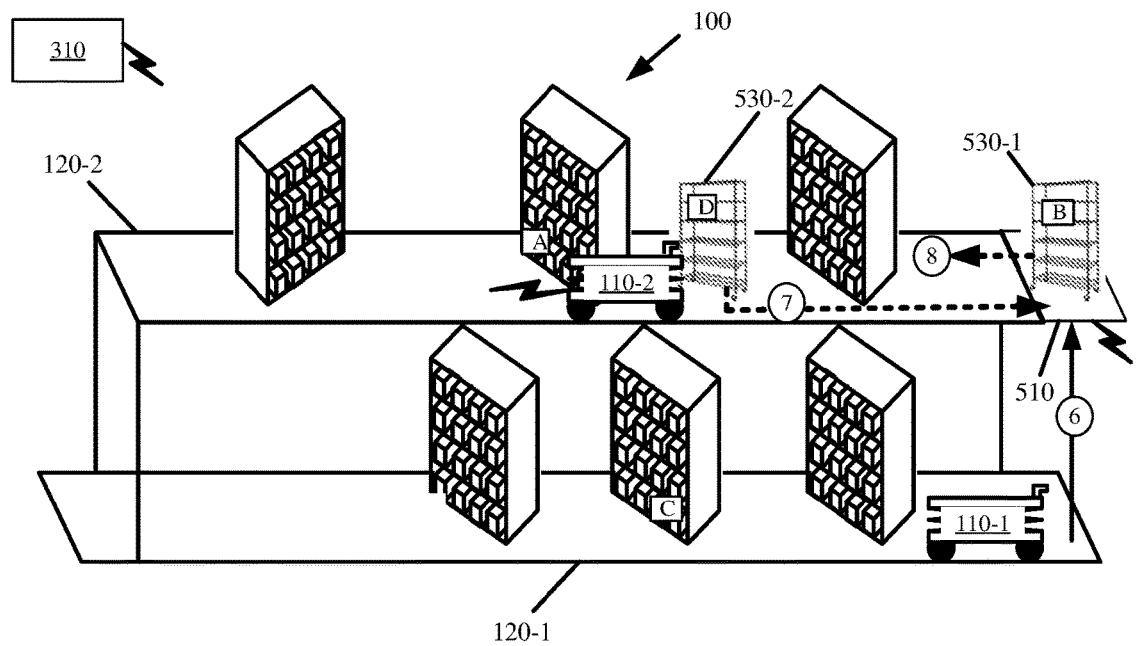
Figure 5D:
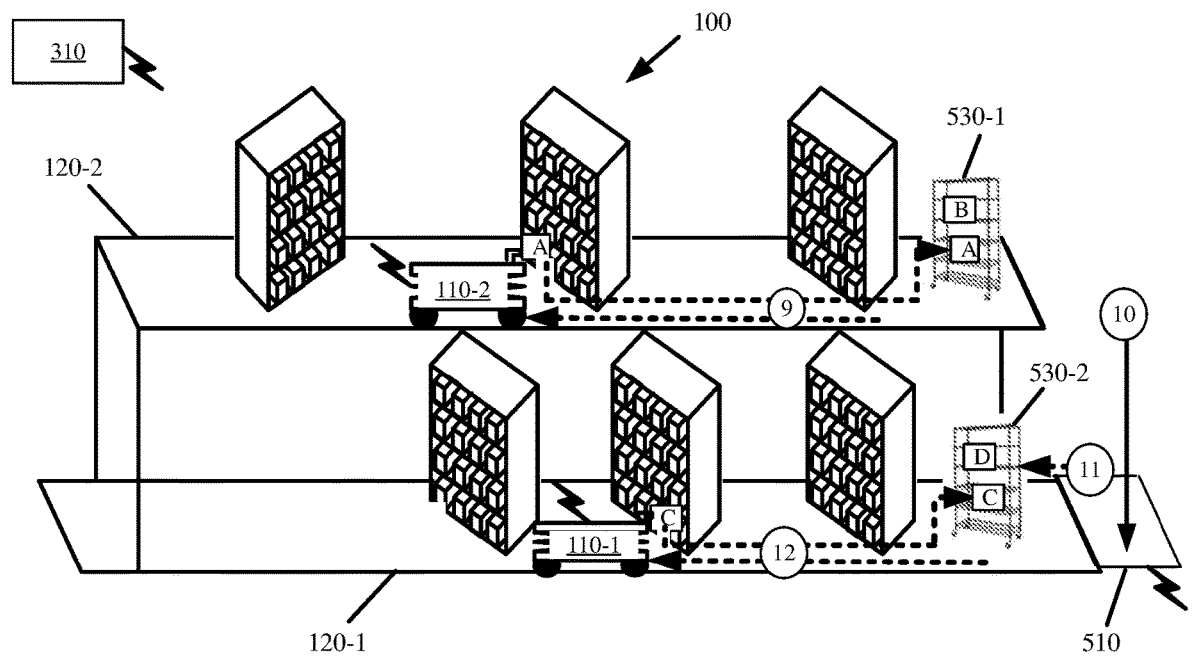

FIGS. 5B, 5C, and 5D illustrate examples of subsequent operations that are coordinated by robot controller 310 and that are performed by robots 110 and lift 510 for the completion of an overall order fulfillment task. The operations shown in FIG. 5B commence in response to first robot 110-1 completing its retrieval tasks before second robot 110-2 (e.g., first robot 110-1 providing scans of the identifiers for objects of first customer order 520-1 on first vertical plane 120-1 that are placed onto storage cart 530-1 to robot controller 310). Robot controller 310 may activate (at 4) lift 510 to lower down to first vertical plane 120-1. In response to lift 510 lowering (at 4) to first vertical plane 120-1, first robot 110-1 may move (at 5) first storage cart 530-1 to lift 510.

First robot 110-1 may directly, or indirectly via robot controller 310, message lift 510 to transfer storage cart 530-1 to second vertical plane 120-2. For instance, first robot 110-1 may scan an identifier of storage cart 530-1 when storage cart 530-1 is placed onto lift 510 and/or an identifier of lift 510, and may pass the scanned identifier(s) to robot controller 310. In response to the scanned identifiers, robot controller 310 may then activate lift 510 to raise to second vertical plane 120-2. As shown in FIG. 5C, lift 510 raises (at 6) cart 530-1 to second vertical plane 120-2. Lift 510 may provide a signal to robot controller 310 upon reaching second vertical plane 120-2. In response to the signal, robot controller 310 may direct second robot 110-2 in placing (at 7) cart 530-2 onto lift 510, and in transferring (at 8) cart 530-1 from lift 510 to second plane 120-2.

As shown in FIG. 5D, robot controller 310 may further coordinate the operations of first robot 110-1, second robot 110-2, and lift 510 to fulfill customer orders 520. For instance, robot controller 310 may direct second robot 110-2 in placing (at 9) the remaining one or more objects for first customer order 520-1, that are located on second vertical plane 120-2, to cart 530-1, that is now located on second vertical plane 120-2. Simultaneously, robot controller 310 may activate (at 10) lift 510 to lower cart 530-2 down to first vertical plane 120-1.

In response to lift 510 lowering (at 10) second storage cart 530-2 to first vertical plane 120-1, first robot 110-1 may retrieve (at 11) second storage cart 530-2 from lift 510 upon robot controller 310 detecting, via one or more sensors of lift 510 or first robot 110-1, that lift 510 has lowered to first plane 120-1. Robot controller 310 may then direct first robot 110-1 in placing (at 12) the remainder of objects for second customer order 520-2, that are located on first vertical plane 120-1, to second storage cart 530-2. When robots 110 complete their operations, each cart 530-1 and 530-2 will store all objects for a different customer order 520. Robots 110 may deliver carts 530 to an order fulfillment location where the first and second customer orders 520 can be packaged and/or shipped to the customers.

In some embodiments, each robot 110 may retrieve objects for two or more different customer orders 520 to an available storage cart 530 prior to transferring storage carts 530 via lift 510. In some other embodiments, the coordinated operation may be modified so that first robot 110-1 retrieves all objects of first customer order 520-1 and second customer order 520-2 that are located on first vertical plane 120-1 to first storage cart 530-1, and second robot 110-2 retrieves all objects of first customer order 520-1 and second customer order 520-2 that are located on second vertical plane 120-2 to second storage cart 530-2. Storage carts 530-1 and 530-2 may then be brought to a common packaging station either on first vertical plane 120-1 or second vertical plane 120-2, via coordinated operation of lift 510 and/or robots 110. Objects for first customer order 520-1 and second customer order 520-2 can then be aggregated from first and second storage carts 530-1 and 530-2 directly at the packaging station.

Figure 6:
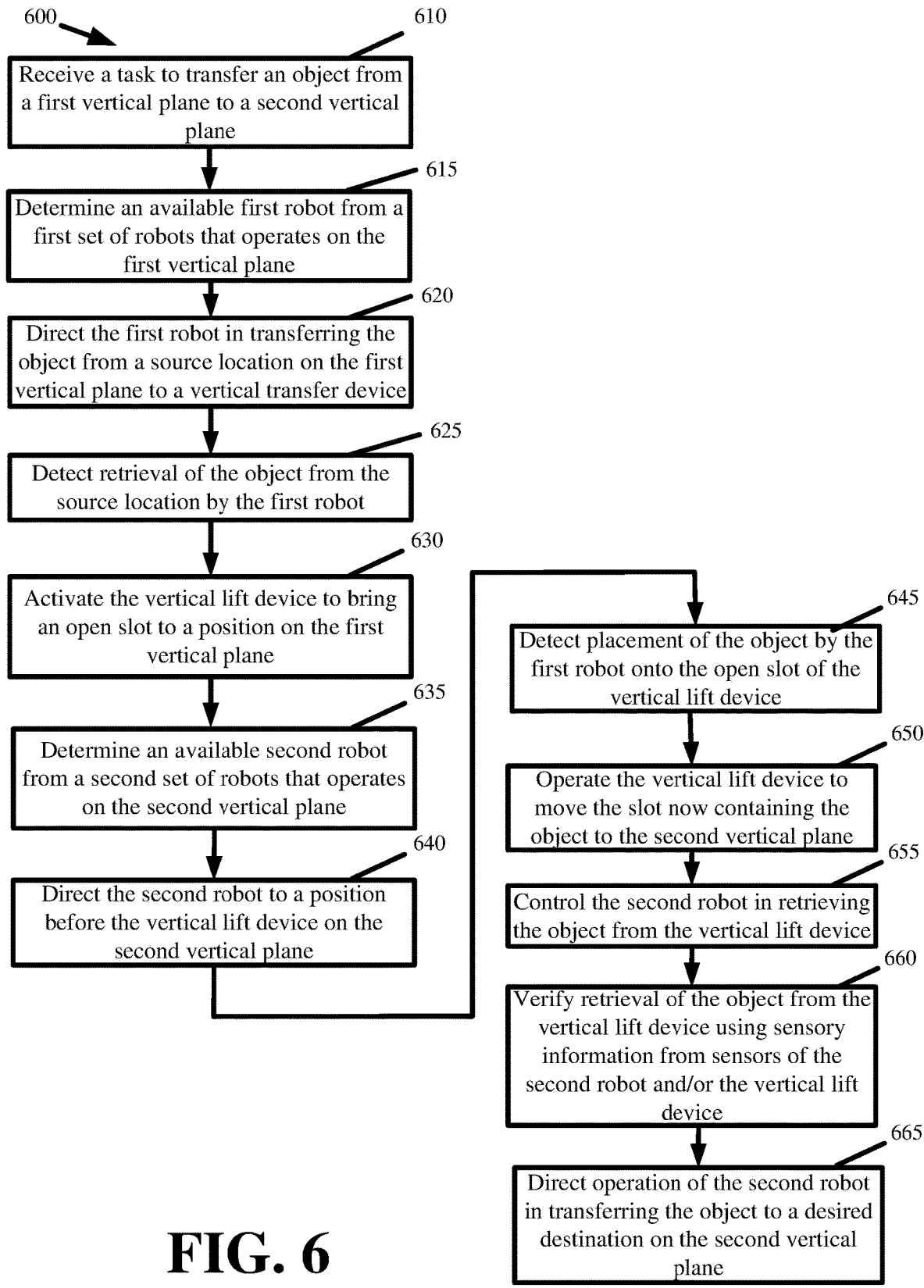
FIG. 6 presents a process that is performed by a robot controller for coordinating the transfer of an object across different planes using robots that exclusively operate on one plane and a vertical transfer device.

FIG. 6 presents process 600 that is performed by robot controller 310 for coordinating the transfer of an object across different planes 120 using robots 110 that exclusively operate on one plane 120 and a vertical transfer device (e.g., conveyor 210). Process 600 may commence in response to receiving (at 610) a task to transfer an object from first vertical plane 120-1 to second vertical plane 120-2.

Process 600 may include determining (at 615) an available robot 110-1 from a set of robots 110 that operates on first vertical plane 120-1. In some embodiments, robot controller 310 may broadcast or issue a message to robots 110 operating on first vertical plane 120-1, and robots 110 may respond with their availability and/or task list. In some embodiments, robot controller 310 may track the tasks that it assigns to robots 110 on different planes, and may select robot 110-1 when robot 110-1 is idle, has the fewest remaining tasks to complete, is scheduled to complete its remaining tasks in the least amount of time, or is already in the area where the object is stored.

Process 600 may include directing (at 620) robot 110-1 in transferring the object from a source location on first vertical plane 120-1 to the vertical transfer device. In some embodiments, directing (at 620) robot 110-1 may include activating, operating, and/or controlling one or more actuators (e.g., motors, retriever, lift, and/or other mechanical elements) of robot 110-1 in order to move robot 110-1 to the source location, identify the object at the source location using one or more sensors of robot 110-1, physically retrieve the object from the source location using a mechanical retriever of robot 110-1, and move robot 110-1 with the object to the vertical transfer device.

Process 600 may include detecting (at 625) retrieval of the object from the source location by robot 110-1 using sensory information from one or more sensors of robot 110-1. For instance, the sensors may provide scans or images of the object, object identifier, and/or source location from robot 110-1 to robot controller 310 in order to confirm retrieval of the correct object. The sensors may also include weight or force sensors that measure properties of the retrieved object to confirm that the correct object was retrieved.

In response to detecting (at 625) the object retrieval, process 600 may include coordinating subsequent operations between robot 110-1, the vertical lift device, and another robot 110 on second vertical plane 120-2. In particular, process 600 may include activating (at 630) the vertical lift device in order to bring an open slot to a position on first vertical plane 120-1. Here again, activating (at 630) the vertical lift device may include robot controller 310 controlling operation of the vertical lift device so that it turns or rotates until the open slot is at the correct position. Robot controller 310 may detect the open slot and/or position of the open slot using one or more sensors of the vertical lift device. For example, a camera of vertical lift device that is located at first vertical plane 120-1 may continuously image the slots of vertical lift device until an open slot is detected, and the vertical lift device may halt movements when the open slot is detected by the camera that is located at first vertical plane 120-1. Alternatively, each slot of the vertical lift device may include a sensor to determine if an object is placed in that slot, or robot controller 310 may track which slots of the vertical lift device are occupied and unoccupied based on objects placed on the vertical lift device by robots 110. Process 600 may also include determining (at 635) an available robot 110-2 from a set of robots 110 that operates on second vertical plane 120-2, and directing (at 640) robot 110-2 to a position before the vertical lift device on second vertical plane 120-2.

Process 600 may include detecting (at 645) placement of the object by first robot 110-1 onto the open slot of the vertical lift device. Robot controller 310 may detect the object placement using sensory information from sensors of either first robot 110-1 and/or the vertical lift device. For instance, first robot 110-1 may have a camera that images the object, object identifier, and/or open slot identifier to confirm placement of the object on the vertical lift device. The scanned identifiers may be passed from first robot 110-1 to robot controller 310 via a wireless network. Alternatively, the vertical lift device may have a camera and/or load sensors to detect when an object is placed onto the open slot, and can identify the slot that is occupied by the object via wireless messaging sent to robot controller 310.

In response to detecting (at 645) the placement of the object onto the vertical lift device, process 600 may include operating (at 650) the vertical lift device to move the slot now containing the object to second vertical plane 120-2, and to stop the vertical lift device once the slot reaches second vertical plane 120-2. Robot controller 310 may use a camera or other sensor of the vertical lift device to detect the slot with the desired object, and to stop operation of the vertical lift device in response to the slot reaching second vertical plane 120-2. Alternatively, robot controller 310 may receive sensory information from a camera of second robot 110-2 to detect when the slot with the desired object reaches second vertical plane 120-2.

Process 600 may include controlling (at 655) second robot 110-2 in retrieving the object from the vertical lift device. For instance, robot controller 310 may control various actuators (e.g., motors, retriever, lift, and/or mechanical elements) and/or sensors of second robot 110-2 to engage the object and remove the object from the vertical lift device. Robot controller 310 may verify (at 660) retrieval of the object from the vertical lift device using sensory information from sensors of second robot 110-2 and/or sensors of the vertical lift device.

Process 600 may then include directing (at 665) operation of second robot 110-2 in transferring the object to a desired destination on second vertical plane 120-2. By accessing information from actuators and/or sensors of second robot 110-2, robot controller 310 may confirm that the correct object is transferred to the correct destination.

Figure 7:
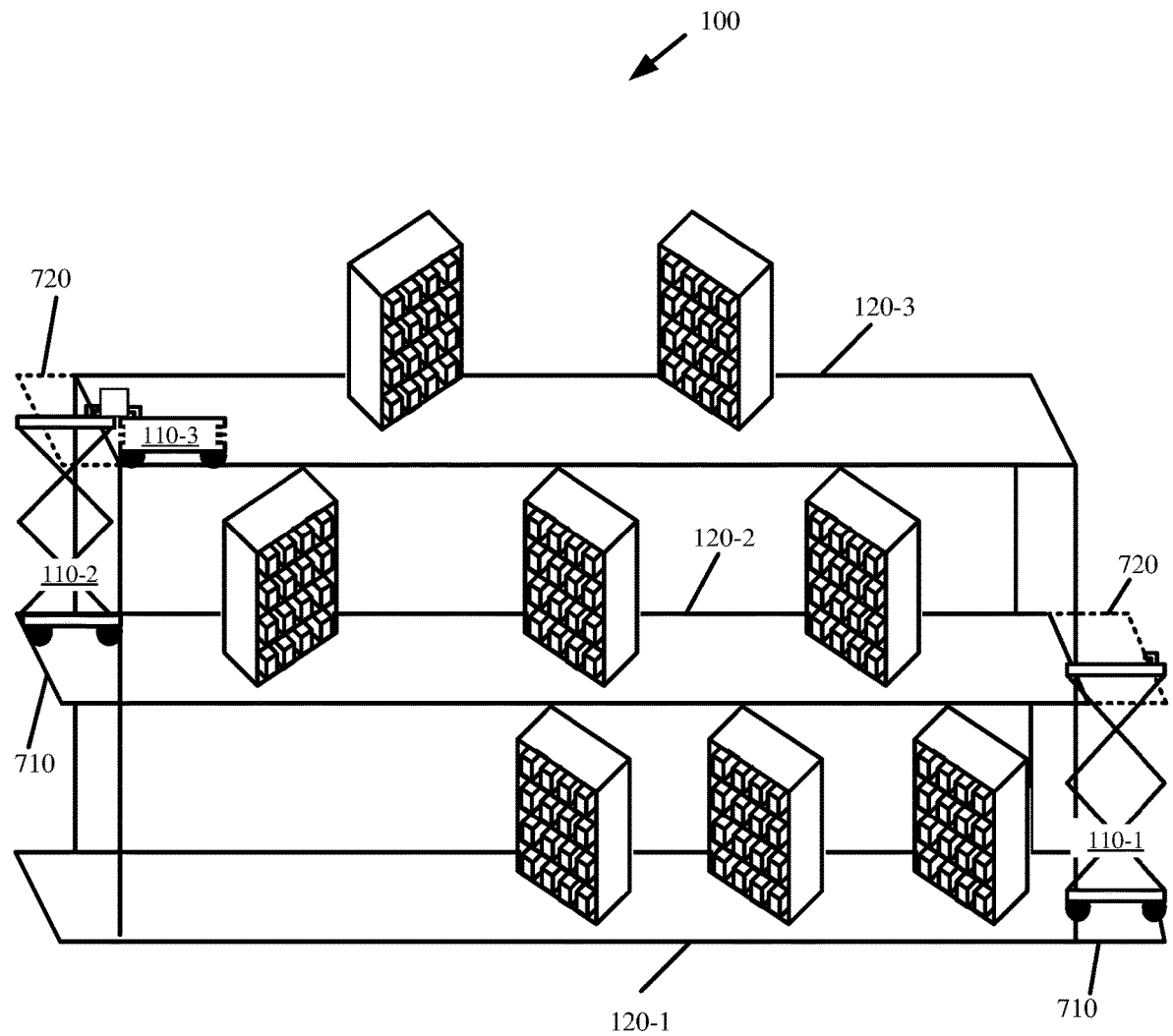
FIG. 7 illustrates an example of robots, operating on different vertical planes, directly transferring objects between different vertical planes in accordance with some embodiments presented herein.

Some embodiments simplify the automated vertical transfer system by eliminating use of a third device (e.g., conveyor 210, lift 510, etc.) for the transfer of objects between different vertical planes 120. FIG. 7 illustrates an example of robots 110, operating on different vertical planes 120, directly transferring objects between different vertical planes 120 in accordance with some embodiments presented herein.

As shown in FIG. 7, the automated vertical transfer system includes first robot 110-1, operating on first vertical plane 120-1, second robot 110-2, operating on second vertical plane 120-2 of site 100, and third robot 110-3, operating on second vertical plane 120-3 of site 100. Each plane 120 has protruding side 710 that is aligned underneath access portal 720 of a next higher plane 120. For instance, first plane 120-1 may include protruding side 710 that is vertically aligned with access portal 720 at second plane 120-2.

Each robot 110 has a lift or articulating arm that allows the robot 110 to reach at least the highest storage location on the vertical plane 120 on which that robot 110 operates. For instance, each vertical plane 120 may have one or more storage racks placed atop that vertical plane 120 with the highest storage location of the storage rack being less than the height of a next plane 120 or roof of site 100. Each storage rack may include different rows that store objects at different heights on the corresponding vertical plane 120. For example, to retrieve or place an object to the topmost row, robot 110-1 may elevate its lift, with a retriever atop of the lift, to the height of the topmost row.

To transfer objects between vertical planes 120 in FIG. 7, robots 110 may coordinate their positioning about an aligned protruding side 710 and access portal 720. For instance, FIG. 7 illustrates second robot 110-2 positioning itself about protruding side 710 of second vertical plane 120-2, and third robot 110-3 positioning itself next to access portal 720 on third vertical plane 120-3 in order to coordinate the transfer of an object from one plane 120 to another. For instance, second robot 110-2 may be transferring an object from second vertical plane 120-2 to third vertical plane 120-3 for retrieval by third robot 110-3, or third robot 110-3 may place an object on the platform atop the elevated lift of second robot 110-2 in order to transfer an object from third vertical plane 120-3 to second vertical plane 120-2.

In some embodiments, the lift or articulating arm of robot 110 may be able to reach the highest storage location on the vertical plane 120 that robot 110 operates on, but may be unable to extend higher in order to reach access portal 720 of a next higher vertical plane 120. For instance, the lift or articulating arm of first robot 110-1 may be able to reach the highest storage location on first vertical plane 120-1 from the ground level of first vertical plane 120-1, but may be unable to extend higher in order to reach access portal 720 of second vertical plane 120-2 from the ground level of first vertical plane 120-1. In some such embodiments, each vertical plane 120 may be modified to include a ramp at protruding side 710 of that vertical plane 120. Accordingly, the ramp may be positioned below access portal 720 of a next higher vertical plane 120.

Figure 8:
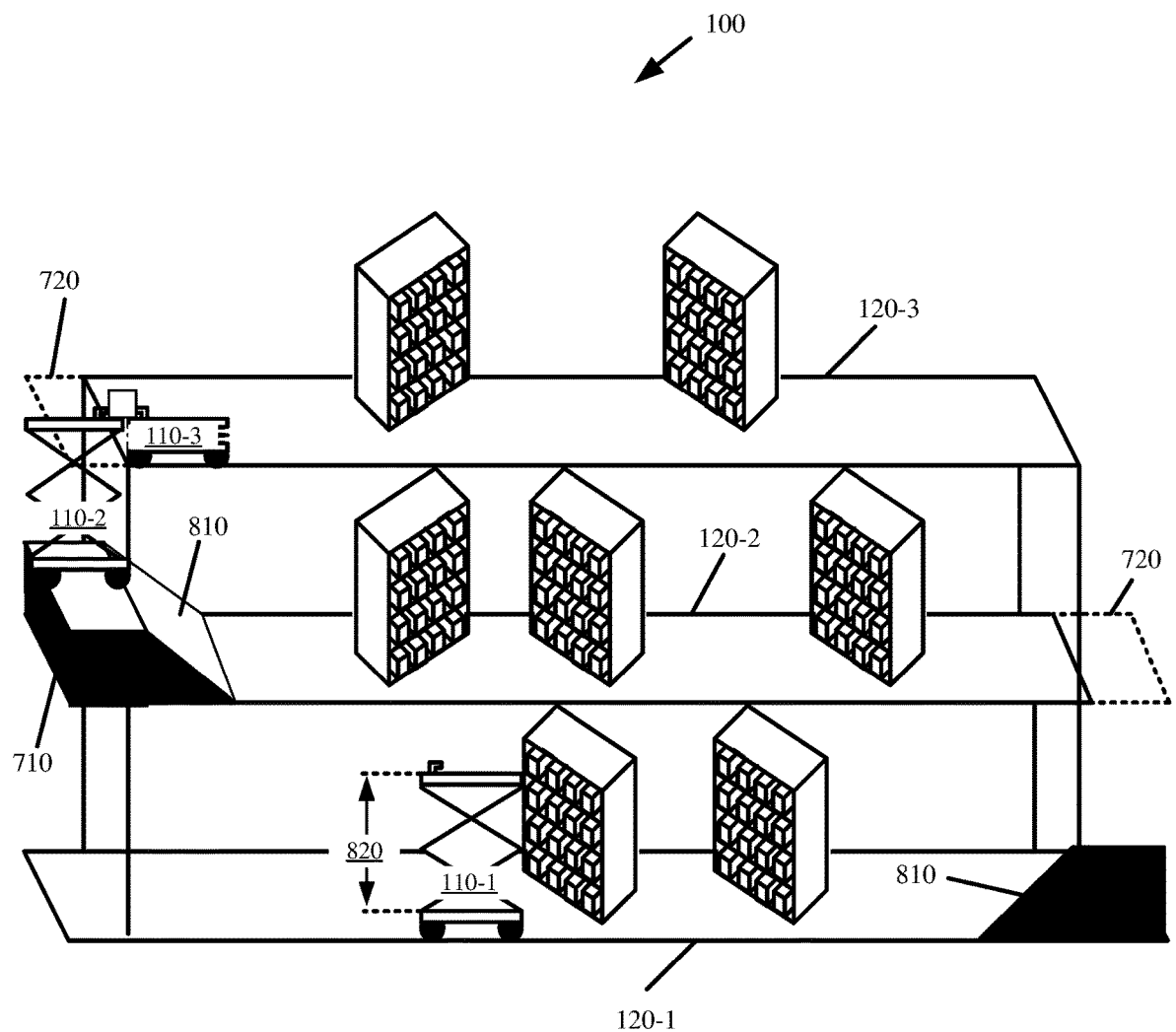
FIG. 8 illustrates an example of robots directly transferring objects across different vertical planes using a ramp in accordance with some embodiments.

FIG. 8 illustrates an example of robots 110 directly transferring objects across different vertical planes using ramp 810 in accordance with some embodiments. As shown in FIG. 8, first robot 110-1 and other robots 110 may have maximum height 820 that is sufficient to reach the highest stored object on a corresponding vertical plane 120, but maximum height 820 may be less than the height needed to reach the next higher vertical plane 120. Ramp 810 may supplement the reach of robot 110 so that robot 110 may access a next higher vertical plane 120 when robot 110 is atop ramp 810. For instance, second robot 110-2 may move onto ramp 810 on protruding side 710 of second vertical plane 120-2, and may elevate its lift or articulating arm towards access portal 720 of third vertical plane 120-3. The height of ramp 810 combined with maximum height 820 of second robot's 110-2 lift or articulating arm, allows the lift or articulating arm of second robot 110-2 to extend through access portal 720 of third vertical plane 120-3, and thereby reach third vertical plane 120-3. Accordingly, when lift or articulating arm of second robot 110-2, operating on second vertical plane 120-2, is fully extended, and second robot 110-2 is atop ramp 810, third robot 110-3, operating on second vertical plane 120-3, may retrieve an object from the lift or articulating arm of second robot 110-2, or may place an object onto the lift or articulating arm of second robot 110-2, thereby allowing robots 110 to transfer objects between different vertical planes 120 without either robot 110 physically moving to a different vertical plane 120.

Figure 9:
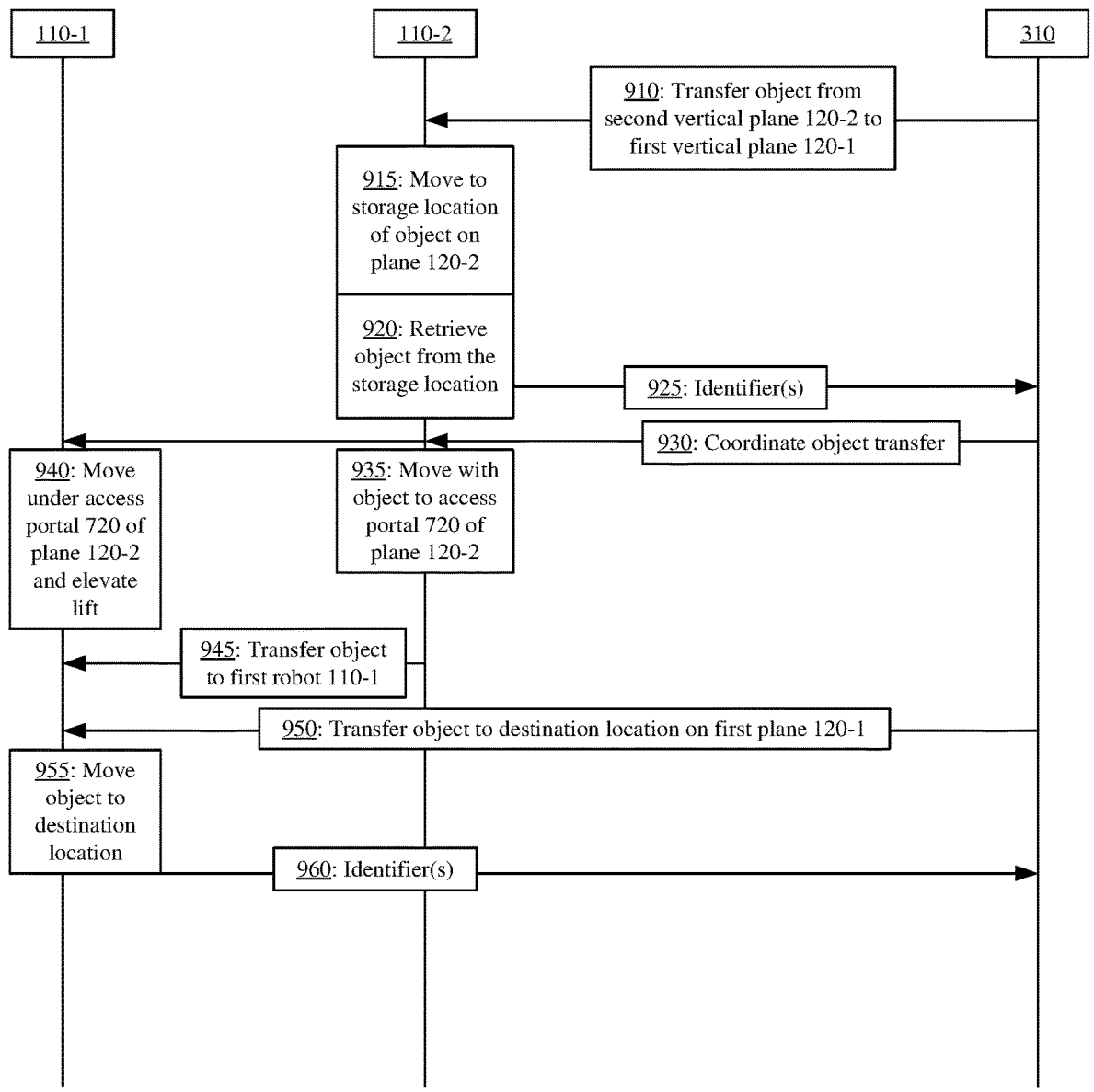
FIG. 9 illustrates an example of coordinating the operation of robots on different vertical planes for the direct transfer of objects between different vertical planes in accordance with some embodiments presented herein.

FIG. 9 illustrates an example of coordinating the operation of robots 110 on different vertical planes 120 for the direct transfer of objects between different vertical planes 120 in accordance with some embodiments presented herein. The coordinated operation illustrated in FIG. 9 may involve first robot 110-1, that operates on first vertical plane 120-1, second robot 110-2, that operates on second vertical plane 120-2, and robot controller 310.

The coordinated operation may commence in response to second robot 110-2 receiving (at 910) directly, or indirectly from robot controller 310, an instruction to transfer an object from second vertical plane 120-2 to first vertical plane 120-1. The object may be part of a customer order being fulfilled at a location on first vertical plane 120-1, or may be used to replenish or restock inventory that is stored on first vertical plane 120-1.

In response to second robot 110-2 receiving the instruction, second robot 110-2 may move (at 915) to a storage location of the object on second vertical plane 120-2, and may retrieve (at 920) the object from the storage location. Second robot 110-2 may image or scan an object identifier and/or storage location identifier to verify retrieval of the correct object from the correct location, and may provide (at 925) the identifier(s) (e.g., fiducials, barcodes, and/or other visual markers) to robot controller 310.

The identifier(s) may cause robot controller 310 to synchronize and coordinate (at 930) the next movements and operations of second robot 110-2 and first robot 110-1 for the transfer of the retrieved object from second vertical plane 120-2 to first vertical plane 120-1. For instance, robot controller 310 may direct second robot 110-2 in transferring (at 935) the retrieved object to access portal 720 at second vertical plane 120-2 while simultaneously directing first robot 110-1 in moving (at 940) about first vertical plane 120-1 to a position underneath access portal 720 of second vertical plane 120-2.

In some embodiments, the retrieval of the object by second robot 110-2, and/or the instruction to transfer the object to a destination location on first vertical plane 120-1, may trigger movement of first robot 110-1 and/or positioning of first robot 110-1 underneath second vertical plane 120-2 access portal 720. In other words, actions by second robot 110-2 may trigger actions of first robot 110-1.

In some embodiments, second robot 110-2 or robot controller 310, upon retrieval of the object from second vertical plane 120-2, may determine that the object is to be transferred to first vertical plane 120-1, and may broadcast messaging to all robots 110 operating on first vertical plane 120-1 that one robot 110 in first vertical plane 120-1 is needed to perform the object transfer to first vertical plane 120-1 with second robot 110-2. In some such embodiments, first robot 110-1 may be an available robot 110 that operates on first vertical plane 120-1, and first robot 110-1 may respond to the messaging from second robot 110-2 or robot controller 310 by indicating that it will coordinate the object transfer with second robot 110-2.

Once first robot 110-1 is positioned underneath access portal 720 of second vertical plane 120-2, and has raised its lift to at least the height of second vertical plane 120-2 (e.g., with or without the additional height provided by ramp 810 on first vertical plane 120-1), and once second robot 110-1 arrives at access portal 720 of second vertical plane 120-2, second robot 110-2 may transfer (at 945) the object to first robot 110-1. For instance, robots 110 may notify robot controller 310 when they are in position, and robot controller 310 may command robots 110 in transferring the object. Robot controller 310 may monitor actuators and/or movements of robots 110 to determine when they are properly positioned before issuing a command for robots 110 to complete the object transfer.

In some embodiments, second robot 110-2 may detect when the lift of first robot 110-1 is aligned with second vertical plane 120-2 at access portal 720 via one or more sensors, and may initiate the object transfer in response to detecting the lift alignment. For instance, the lift may have an identifier that identifies the lift of first robot 110-1, and second robot 110-2 may image or scan the identifier to determine when the lift is properly aligned, and that the lift belongs to first robot 110-1. In some embodiments, robots 110 may directly message one another to coordinate operations and complete the object transfer.

First robot 110-1 may sense when second robot 110-2 places the object onto the lift and/or platform that is atop the lift via one or more sensors. Alternatively, second robot 110-2 may provide a message, directly or indirectly via robot controller 310, to first robot 110-1 once the object transfer is complete. Robot controller 310 may provide (at 950) a message to first robot 110-1 to transfer the object to a desired destination about first vertical plane 120-1.

In response to the message, first robot 110-1 may lower its lift before moving (at 955) the object to the desired destination about first vertical plane 120-1. First robot 110-1 may image or scan an identifier of the desired destination once the object is delivered, transferred, and/or placed to the desired, and/or image or scan the identifier of the object. First robot 110-1 may provide (at 960) the identifier(s) to robot controller 310. The identifier(s) confirm that the singular task of transferring the object between different vertical planes 120 was completed by first robot 110-1 and second robot 110-2 without either robot 110 moving between the different vertical planes 120.

Figure 10:
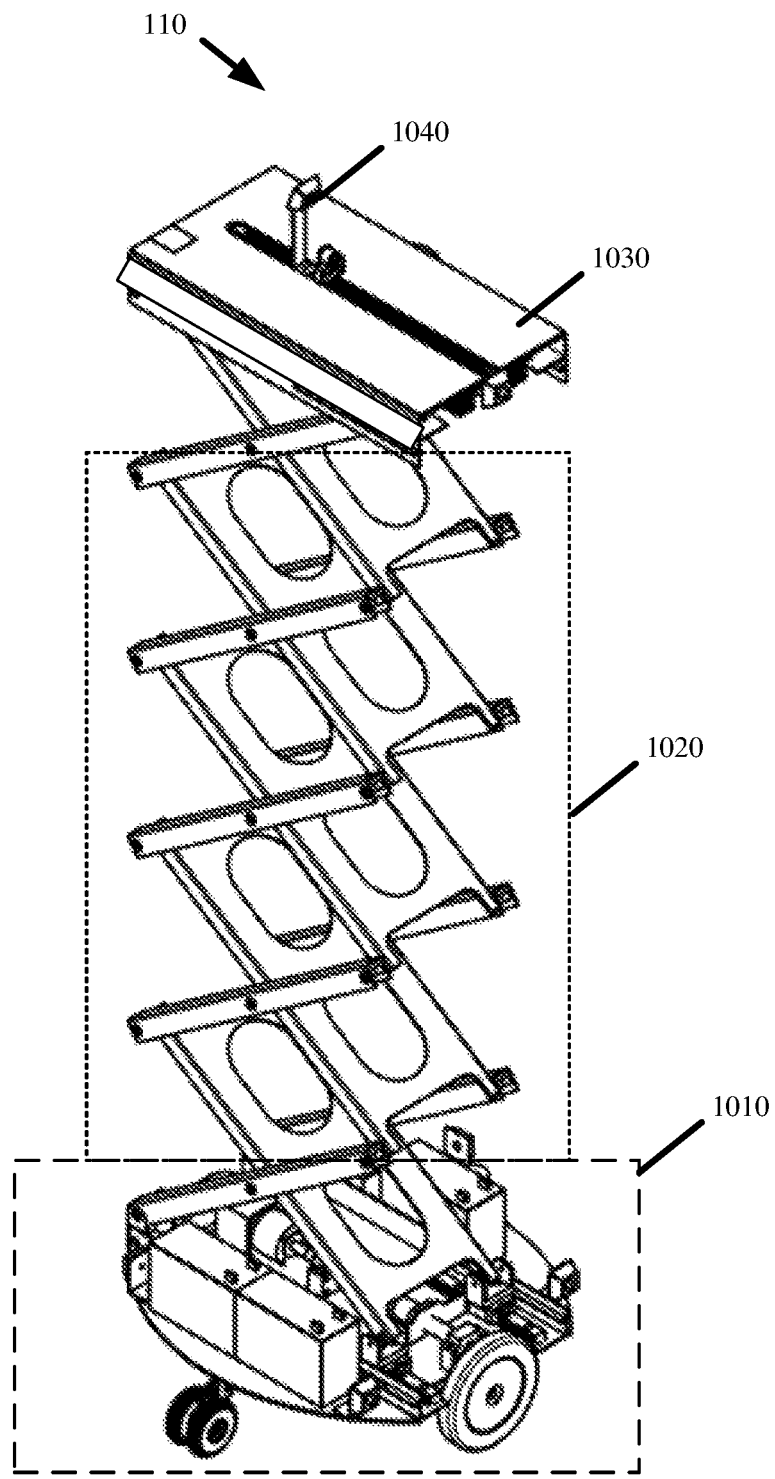
FIG. 10 illustrates an example of a robot in accordance with some embodiments presented herein.

FIG. 10 illustrates an example of robot 110 in accordance with some embodiments presented herein. In some embodiments, robot 110 may be an example of a retrieval robot, transfer robot, and/or other autonomous robot that may be under control of robot controller 310, and/or that performs automated and coordinated operations with other robots 110 in site 100.

Robot 110 may include a motorized base 1010 on which one or more motors, batteries, processors, wireless radios, sensors, and wheels are mounted. Motorized base 1010 powers locomotion or movement of robot 110 in three-dimensional space. In some embodiments, motorized base 1010 may include articulating legs, propellers, tracks, or other means of locomotion besides the illustrated wheels.

Atop motorized base 1010 is lift 1020 that raises and lowers platform 1030. As shown, lift 1020 may include a collapsing and expanding structure. In some embodiments, lift 1020 may include a pneumatic piston or other means for raising and lowering platform 1030.

Platform 1030 may include an elongated surface onto which objects retrieved by robot 110 may be retained during transport. Platform 1030 may also include mechanical retriever 1040 for retrieving containers and/or other objects onto platform 1030. Mechanical retriever 1040 may include at least one motor or actuator for moving mechanical retriever 1040 across the surface of platform 1030 in order to engage an object and then pull the object onto platform 1030. Mechanical retriever 1040 may include one or more retrieval elements. The retrieval element may include a vacuum that uses suction to engage containers and/or other objects. The retrieval element may alternatively include a gripper, articulating mechanical arm, or other means to grab or otherwise engage containers and/or objects.

Figure 11:
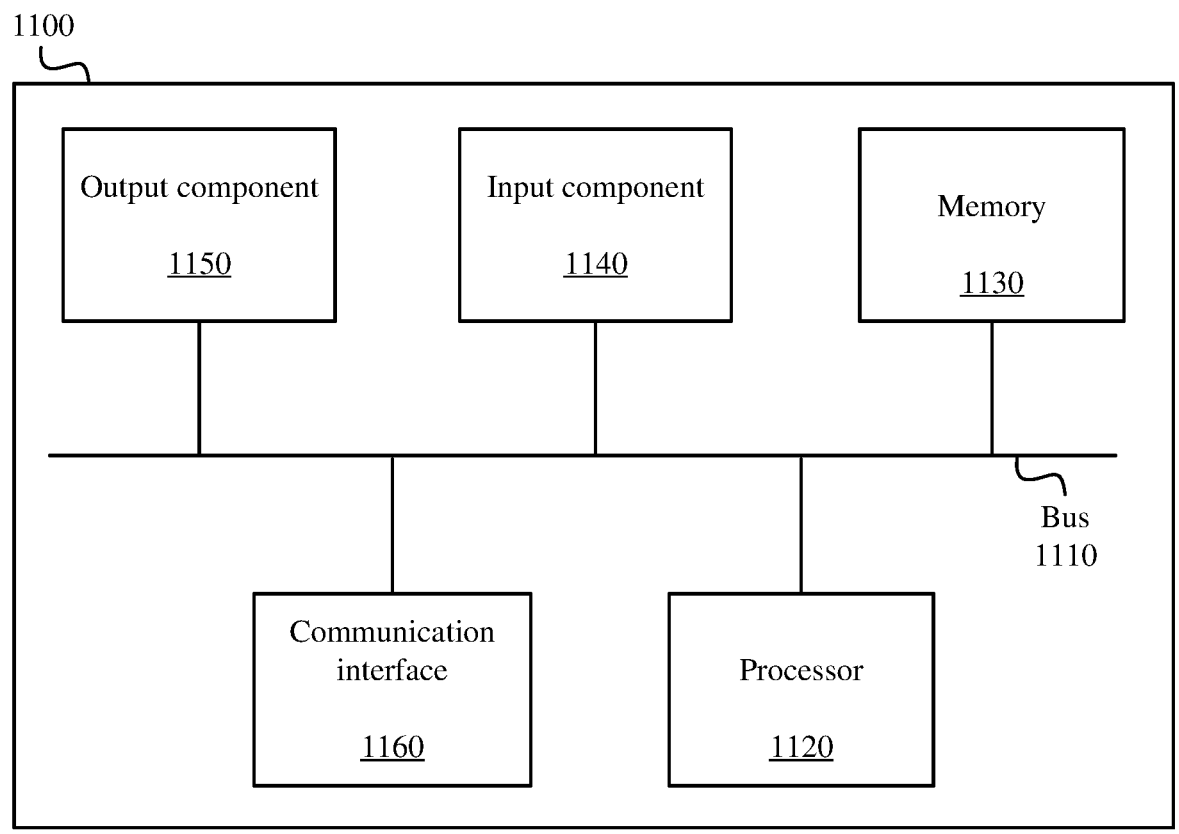
FIG. 11 illustrates example components of one or more devices, according to one or more embodiments described herein.

FIG. 11 is a diagram of example components of device 1100. Device 1100 may be used to implement robot controller 310, robot 110, and/or certain of robot 110 components. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system comprising:
 a first robot, operating on a first vertical plane of a site, the first robot comprising one or more sensors, a motorized base, and a retriever;
 a second robot, operating on a different second vertical plane of the site, the second robot comprising one or more sensors, a motorized base, and a retriever;
 a conveyor comprising one or more sensors, a plurality of slots that move between the first vertical plane and the second vertical plane, a first access point at a first position of the first vertical plane, and a second access point at a second position of the second vertical plane; and
 a robot controller comprising:
  a non-transitory computer-readable medium storing a set of processor-executable instructions; and
  one or more processors configured to execute the set of processor-executable instructions, wherein executing the set of processor-executable instructions causes the one or more processors to:
   receive an instruction to transfer an object from the first vertical plane to the second vertical plane;
   detect retrieval of the object from the first vertical plane by the first robot based on sensory information from the one or more sensors of the first robot;
   direct the first robot to the first position on the first vertical plane, and the second robot to the second position on the second vertical plane that is vertically aligned with the first position of the first robot in response to detecting the object retrieval; and
   coordinate operations with which the first robot, at the first position, transfers the object to the second robot, at the second position, using the conveyor.

2. The system of claim 1, further comprising:
 a ground surface that forms one of the first vertical plane or the second vertical plane; and
 a mezzanine that is erected atop the ground surface, and that forms another of the first vertical plane or the second vertical plane.

3. The system of claim 2, further comprising:
 a first set of storage racks disposed on the ground surface;
 a second set of storage racks disposed on the mezzanine;
 wherein each storage rack of the first and second sets of storage racks comprises a plurality of openings and one or more objects that are stored in a subset of the plurality of openings.

4. The system of claim 3, wherein the processor-executable instructions further include processor-executable instructions to:
 provide a first message to the first robot prior to detecting the object retrieval, the first message comprising (i) a first location of the object on a first storage rack from the first set of storage racks, or (ii) a first identifier disposed at the first location;
 provide a second message to the second robot, the second message comprising (i) a second location for the object on a second storage rack from the second set of storage racks, or (ii) a second identifier disposed at the second location.

5. The system of claim 1, wherein the processor-executable instructions to coordinate the operations include processor-executable instructions to:
 activate the conveyor;
 synchronize activation of the retriever of the first robot with the conveyor moving an open particular slot of the plurality of slots to the first access point, wherein activating the retriever of the first robot results in the object transferring from the first robot to the particular slot; and
 synchronize activation of the retriever of the second robot with the conveyor moving the particular slot with the object to the second access point, wherein activating the retriever of the second robot results in the object transferring from the particular slot to the second robot.

6. The system of claim 1, wherein the processor-executable instructions further include processor-executable instructions to:
 activate the conveyor, wherein activating the conveyor comprises moving the plurality of slots around the first access point;
 detect a particular slot from the plurality of slots that is unoccupied based on sensory information from the one or more sensors of the conveyor or the one or more sensors of the first robot; and
 stop the conveyor in response to the particular slot reaching the first access point.

7. The system of claim 6, wherein the processor-executable instructions further include processor-executable instructions to:
 detect the object occupying the particular slot based on sensory information from the one or more sensors of the conveyor or the one or more sensors of the first robot; and
 resume operation of the conveyor until the particular slot reaches the second access point.

8. The system of claim 6, wherein the processor-executable instructions further include processor-executable instructions to:
 obtain an identifier uniquely identifying the particular slot from other slots of the plurality of slots;
 provide the identifier to the second robot;
 resume operation of the conveyor; and
 stop operation of the conveyor in response to the second robot detecting the identifier.

9. A non-transitory computer-readable medium, storing a set of processor-executable instructions, which, when executed by one or more processors, cause the one or more processors to:
 receive an instruction to transfer an object from a first vertical plane to a different second vertical plane;
 detect retrieval of the object from the first vertical plane by a first robot based on sensory information from one or more sensors of the first robot;
 direct the first robot to a first position on the first vertical plane, and a second robot, operating on the second vertical plane, to a second position on the second vertical plane that is vertically aligned with the first position of the first robot in response to detecting the object retrieval; and
 coordinate operations with which the first robot, at the first position, transfers the object to the second robot, at the second position, wherein coordinating the operations comprises:
  activating a conveyor comprising a plurality of slots, wherein activating the conveyor comprises moving the plurality of slots around a first access point located at the first position;
  detecting a particular slot from the plurality of slots that is unoccupied based on sensory information from one or more sensors of the conveyor or the one or more sensors of the first robot; and stopping the conveyor in response to the particular slot reaching the first access point.

10. The non-transitory computer-readable medium of claim 9, wherein the processor-executable instructions further include processor-executable instructions to:
detect the object occupying the particular slot based on sensory information from the one or more sensors of the conveyor or the one or more sensors of the first robot; and
resume operation of the conveyor until the particular slot reaches the second access point in response to detecting the object occupying the particular slot.

11. A method comprising:
receiving an instruction to transfer an object from a first vertical plane to a different second vertical plane;
detecting retrieval of the object from the first vertical plane by a first robot based on sensory information from one or more sensors of the first robot;
directing the first robot to a first position on the first vertical plane, and a second robot, operating on the second vertical plane, to a second position on the second vertical plane that is vertically aligned with the first position of the first robot in response to detecting the object retrieval; and
coordinating operations with which the first robot, at the first position, transfers the object to the second robot, at the second position, wherein coordinating the operations comprises:
activating a conveyor with a plurality of slots that move between the first position on the first vertical plane and the second position on the second vertical plane;
synchronizing activation of a retriever of the first robot with the conveyor moving an open particular slot of the plurality of slots to the first position, wherein activating the retriever of the first robot results in the object transferring from the first robot to the particular slot; and
synchronizing activation of a retriever of the second robot with the conveyor moving the particular slot with the object to the second position wherein activating the retriever of the second robot results in the object transferring from the particular slot to the second robot.

12. A system comprising:
a ground surface that forms a first vertical plane of a site, the ground surface comprising a first set of storage racks;
a mezzanine that is erected atop the ground surface, and that forms a second vertical plane of the site, the mezzanine comprising a second set of storage racks, and wherein each storage rack of the first and second sets of storage racks comprises a plurality of openings and one or more objects that are stored in a subset of the plurality of openings;
a first robot, operating on the first vertical plane, the first robot comprising one or more sensors, a motorized base, and a retriever;
a second robot, operating on the second vertical plane, the second robot comprising one or more sensors, a motorized base, and a retriever; and
a robot controller comprising one or more processors configured to:
receive an instruction to transfer an object from the first vertical plane to the second vertical plane;
detect retrieval of the object from the first vertical plane by the first robot based on sensory information from the one or more sensors of the first robot;
direct the first robot to a first position on the first vertical plane, and the second robot to a second position on the second vertical plane that is vertically aligned with the first position of the first robot in response to detecting the object retrieval; and
coordinate operations with which the first robot, at the first position, transfers the object to the second robot, at the second position.

13. A system comprising:
a first robot, operating on a first vertical plane of a site, the first robot comprising one or more sensors, a motorized base, a retriever, and a lift that extends to a plurality of different heights;
a second robot, operating on a different second vertical plane of the site, the second robot comprising one or more sensors, a motorized base, and a retriever;
a ramp at a first position of the first vertical plane, the ramp increasing a height reachable with the lift when the first robot is at the first position;
an access portal at a second position of the second vertical plane with a size that is greater than dimensions of the object; and
a robot controller comprising one or more processors configured to:
receive an instruction to transfer an object from the first vertical plane to the second vertical plane;
detect retrieval of the object from the first vertical plane by the first robot based on sensory information from the one or more sensors of the first robot;
direct the first robot to the first position on the first vertical plane, and the second robot to the second position on the second vertical plane that is vertically aligned with the first position of the first robot in response to detecting the object retrieval; and
coordinate operations with which the first robot, at the first position, transfers the object to the second robot, at the second position, wherein coordinating the operations comprises:
activating the lift of the first robot with the object placed atop the lift; and
stopping the lift in response to detecting the object at the second position via sensory information from the one or more sensors of the first robot or the one or more sensors of the second robot.

14. A system comprising:
a first robot, operating on a first vertical plane of a site, the first robot comprising one or more sensors, a motorized base, a retriever, and a lift that extends to a plurality of different heights;
a second robot, operating on a different second vertical plane of the site, the second robot comprising one or more sensors, a motorized base, and a retriever;
a lift moving vertically between a first position on the first vertical plane and a second position on the second vertical plane; and
a robot controller comprising one or more processors configured to:
receive an instruction to transfer an object from the first vertical plane to the second vertical plane;
detect retrieval of the object from the first vertical plane by the first robot based on sensory information from the one or more sensors of the first robot;
direct the first robot to the first position on the first vertical plane, and the second robot to the second position on the second vertical plane that is vertically aligned with the first position of the first robot in response to detecting the object retrieval; and coordinate operations with which the first robot, at the first position, transfers the object to the second robot, at the second position, using the lift.

15. A method comprising:
receiving an instruction to transfer an object from a first vertical plane to a different second vertical plane;
detecting retrieval of the object from the first vertical plane by a first robot based on sensory information from one or more sensors of the first robot;
directing the first robot to a first position on the first vertical plane, and a second robot, operating on the second vertical plane, to a second position on the second vertical plane that is vertically aligned with the first position of the first robot in response to detecting the object retrieval; and
coordinating operations with which the first robot, at the first position, transfers the object to the second robot, at the second position, wherein coordinating the operations comprises:
 operating the retriever of the first robot to transfer the object from the first robot to a lift that moves vertically between the first position and the second position;
 activating the lift until the lift reaches the second position; and
 operating the retriever of the second robot to transfer the object from the lift to the second robot.

16. A method comprising:
receiving an instruction to transfer an object from a first vertical plane to a different second vertical plane;
detecting retrieval of the object from the first vertical plane by a first robot based on sensory information from one or more sensors of the first robot;
directing the first robot to a ramp that increases a height of the first robot at a first position on the first vertical plane, and a second robot, operating on the second vertical plane, to an access portal at a second position on the second vertical plane that is vertically aligned with the first position of the first robot in response to detecting the object retrieval, wherein the access portal has a size that is greater than dimensions of the object; and
coordinating operations with which the first robot, at the first position, transfers the object to the second robot, at the second position, wherein coordinating the operations comprises:
 activating a lift of the first robot with the object placed atop the lift while the first robot is at the first position, the lift extending to a plurality of different heights; and
 stopping the lift in response to detecting the object at the second position via sensory information from the one or more sensors of the first robot or the one or more sensors of the second robot.

* * * * *